United States Patent [19]

Boord et al.

[11] Patent Number: 4,759,595
[45] Date of Patent: Jul. 26, 1988

[54] INTEGRATED OPTIC SWITCH
[75] Inventors: Warren T. Boord, Brooklyn Park; Anil K. Jain, New Brighton, both of Minn.
[73] Assignee: APA Optics, Inc., Blaine, Minn.
[21] Appl. No.: 843,775
[22] Filed: Mar. 25, 1986
[51] Int. Cl.[4] .................................................. G02B 6/10
[52] U.S. Cl. ................................ 350/96.13; 350/96.14; 350/96.17
[58] Field of Search ................ 350/96.13, 96.14, 96.15, 350/96.17

[56] References Cited

U.S. PATENT DOCUMENTS

| | | | |
|---|---|---|---|
| 3,284,722 | 11/1966 | Gray | 331/94.5 |
| 3,795,433 | 3/1974 | Channin | 350/96 WG |
| 3,801,185 | 4/1974 | Ramaswamy et al. | 350/160 R |
| 3,802,761 | 4/1974 | Giallorenzi | 350/96 WG |
| 3,883,220 | 5/1975 | Taylor | 350/96 WG |
| 4,002,898 | 1/1977 | Milton | 250/199 |
| 4,006,963 | 2/1977 | Baues et al. | 350/96 C |
| 4,008,947 | 2/1977 | Baues et al. | 350/96 C |
| 4,130,342 | 12/1978 | McMahon | 350/96.14 |
| 4,166,669 | 9/1979 | Leonberger et al. | 350/96.14 |
| 4,172,630 | 10/1979 | Burns et al. | 350/96.14 |
| 4,198,116 | 4/1980 | Papuchon | 350/96.14 |
| 4,243,295 | 1/1981 | Alferness | 350/96.14 |
| 4,291,939 | 9/1981 | Giallorenzi et al. | 350/96.14 |
| 4,375,312 | 3/1983 | Tangonan | 350/96.12 |
| 4,420,873 | 12/1983 | Leonberger et al. | 29/576 E |
| 4,439,008 | 3/1984 | Joormann et al. | 350/96.31 |
| 4,445,751 | 5/1984 | Divens et al. | 350/96.17 |
| 4,466,696 | 8/1984 | Carney | 350/96.20 |
| 4,515,430 | 5/1985 | Johnson | 350/96.13 |

OTHER PUBLICATIONS

K. L. Chopra, S. Major, & D. K. Pandya, Thin Solid Films, vol. 102, No. 1, Apr. 8, 1983.
T. Shiosaki, M. Adachi and A. Kawabala, Thin Solid Films, vol. 96, 129–140 (1982).
K. Tominaga, et al., J. Appl. Physics, 999–1002 (1082).
G. L. Tangonan, et al., Appl. Opt. 17, 3259 (1976).
K. E. Bean: IEEE Trans. Elec Devices-25, 1185 (1972).
I. P. Kaminow, E. H. Turner, Linear Electro-optical Materials in "Handbook of Lasers" (R. J. Presley, ed.) pp. 447–459, Chemical Rubber Company Cleveland, Ohio 1971.
C. S. Tsai, B. Kim, F. R. El-Akkari: IEEE J QU-14,513 (1978).
S. J. Ingtrey, W. D. Westwood, Y. C. Cheng, and J. Wei, "Variable Refractive Index and Birefringent Waveguides by Sputtering Tantalum in Ox - Nx mixtures," Applied Optics, 14 p., 2194, 1975.
R. H. Deitch, E. J. West, T. G. Giallorinzi and J. F. Weller, "Sputtering Thin Films For Integrated Optics", Applied Optics, 13, p. 712, 1974.
"Integrated Optics", T. Tamir, editor: Springer Verlag, 2nd Edition (1982), pp. 54–59.
"Thin-Film Laser-to-Fiber Coupler", L. P. Boivin, Applied Optics, vol. 13, No. 2, pp. 391–395, (Feb. 1974).
"Optical Coupling From Fibers to Channel Waveguides Formed on Silicon", J. T. Boyd and S. Sriram, Applied Optics, vol. 17, No. 6, pp. 895–898, (Mar. 15, 1978).
"Scattering Loss Reduction in ZnO Optical Waveguides by Laser Annealing" Subhadra Dutta et al., American Institute of Physics, Appl. Phys. Lett. 39(3), pp. 206–208 (Aug. 1, 1981).

Primary Examiner—Gene Wan
Assistant Examiner—James C. Lee
Attorney, Agent, or Firm—Merchant, Gould, Smith, Edell, Welter & Schmidt

[57] ABSTRACT

A single-mode electro-optic switch (10 or 10') including a graded index layer (14b or 14b'). Two electro-optic embodiments are disclosed. The first embodiment includes a substrate (12) and a planar waveguide (14) atop the substrate (12) including a graded index layer (14b) sandwiched between a pair of lower refractive index layers (14a and b 14c). The substrate (12) preferably forms anisotropically etched V-grooves (38) suitable for receiving fibers (50) and (52) and for registering the cores of the fibers with the middle layer (14b). The first embodiment of the switch includes a single input port and a pair of output ports, wherein when the switch is energized, light is reflected away from the first output port and toward the second output port. The second embodiment (10') includes a pair of input ports and a pair of output ports, wherein energization of the switch couples a pair of substantially parallel waveguides together such that light entering one of the input ports is at least partially directed toward the opposite output port.

27 Claims, 2 Drawing Sheets

INTEGRATED OPTIC SWITCH

FIELD OF THE INVENTION

This invention relates generally to optical systems, including optical fiber light transmission systems. More particularly, it is directed toward optic switches.

BACKGROUND OF THE INVENTION

Optical, or optic, switches have been available for some time. As is well known, optic switches are analogous to electrical switches: a typical optic switch has an input port and at least one output port, wherein the ports can be connected to optic fibers. When the switch is activated, the input port and a selected output port are "coupled" so that light received at the input port is routed to the appropriate output port. There are single "pole", single throw optic switches; single "pole", double throw switches; and so on.

Optic switches have been used in various settings. For example, optic switches are extensively employed in optic fiber communication systems. In addition, optic switches can be used to provide redundant optic paths. While redundant optic paths are often implemented using optic couplers which permanently divide the incoming light between two outgoing paths, this practice can result in a reduced signal-to-noise ratio. Optic switches, on the other hand, can alternatively direct all of the light from one path to another to achieve path redundancy while maintaining a high signal-to-noise ratio.

Optic switching devices are also generally important to optoelectronic connectors, such as repeaters and tranceivers in optic communication links. For example, optic switches can be used to automatically switch out faulty devices in a communications network.

Generally, there are two types of optic switches, mechanical (electro-mechanical) and solid state.

Mechanical optic switches require little power in switching and are passive while maintaining position. Unfortunatley, mechanical switches typically take at least one millisecond to switch the direction of a guided wave. Further, due to their inherent lack of precision, mechanical switches are really only suitable for multi-mode optic fibers having large core diameters (typically approximately 50 to 100 microns).

The sluggishness of the typical mechanical optic switch cannot be tolerated in many instances. Also, single mode fiber systems compatible with fiber core diameters of approximately five microns are becoming more prominent, placing very stringent alignment tolerances which mechanical switches cannot satisfy.

Thus, fast, precise solid state optic switches have been developed. A solid state optic switch preferably possesess the following characteristics: (1) it completely redirects the guided light beam into the selected optic path; (2) it accommodates accurate optic fiber to switch alignment, and matching of the optic fiber and switch light guide modal field profiles (displaying low loss coupling between the fibers and the switch); (3) its operation is independent of light polarization (i.e., works equally well for TE and TM modes); (4) the power required for switching is low; (5) the switch is "passive" while maintaining position; (6) the switch operates reliably; and (7) the switch is rugged.

One type of solid state optic switch uses the electro-optic effect to control the refractive index in a bounded region. Guided light incident on the bounded region will transmit undeflected to a first output port when the index is the same as that of the waveguide. Proper application of an electric field to the bounded region will change the refractive index resulting in total internal reflection (TIR) of the guided light beam to a second output port. Such a TIR switch has been fabricated in lithium niobate (LiNbO$_3$) by Tsai et al, as reported in "Optical Channel Waveguide Switch and Coupler Using Total Internal Reflection," IEEE Journal of Quantum Electronics, Vol. QE-14, No. 7, July 1978, pp. 513-517.

Solid state optic switches are particularly useful due to their potential compatibility with single mode or monomode optic systems. In order to efficiently and easily incorporate an optical switch in a single mode optical fiber system, the transverse dimensions of the integrated optic waveguide must generally be on the order of the optical fiber core diameter. That is, the effective width and thickness of the switch's waveguide must be approximately 5 to 10 microns, even if the dimensions of the switch's waveguide matches that of the single mode fiber, the optic fibers must be precisely aligned with the waveguide to maximize coupling efficiency.

The present invention is directed primarily to the coupling problem discussed above. The invention includes a solid state optic switch which is particularly suitable for single mode optic systems, and the invention substantially eliminates the coupling problem discussed above.

SUMMARY OF THE INVENTION

Accordingly, the present invention includes a single mode integrated optic switch suitable for selectively coupling a first input fiber with either a first output fiber or a second output fiber, including:
 (a) a substrate;
 (b) a waveguide supported by the substrate, including:
  (i) a first layer immediately atop the substrate having a first average refractive index;
  (ii) a second layer atop the first layer having a second average refractive index larger than the first average refractive index and having a graded refractive index, wherein the second layer is suitable for substantial alignment with the fibers' cores and wherein the waveguide is suitable for single mode light transmission;
  (iii) a first input port at one end of the waveguide for operatively receiving the first input fiber; and
  (iv) first and second output ports at the other end of the waveguide for operatively receiving the first and second output fibers, respectively, wherein the waveguide normally guides light from the first input port to the first output port; and
 (c) means in operative proximity of the waveguide for altering the refractive index of a portion of the waveguide to switch at least a portion of the light from the first output port to the second output port.

In preferred embodiments, the "refractive index altering means" includes means for electro-optically altering the refractive index of a portion of the waveguide. The multi-layer waveguides of preferred embodiments include a third layer having a third average refractive index smaller than the second average refractive index, wherein the second layer is between the first and third layers.

The second layer is preferably made of zinc oxide and has a thickness substantially equal to the diameter of the fibers' cores. The zinc oxide preferably has its optical axis perpendicular to the substrate of the switch. Further, the graded index property of the second layer is preferably attributable to a spatial variation in the oxygen concentration of the zinc oxide.

The "refractive index altering means" of the optic switch preferably includes upper and lower electrodes in contact with the waveguide, wherein the portion of the waveguide sandwiched between the electrodes defines a "switching volume". When a voltage of the proper magnitude and polarity is applied across the electrodes, the refractive index of the waveguide in the sandwiched portion decreases (in one embodiment) to cause total internal reflection of the light within the waveguide, whereby light is reflected toward the second output port. In another embodiment of the optic switch of the present invention, application of a voltage across the electrodes causes the refractive index in two adjacent waveguides to change. This causes a portion of the entering light to divert from the first output port to the second output port. This second switch embodiment also includes a second input port, wherein light can enter either input port and exit either output port, depending on whether and to what extent voltage is applied across the electrodes.

The lower electrode of the electro-optic switch preferably includes a low resistivity area formed in the substrate and a metal contact pad in operative contact with the low resistivity area. The low resistivity area runs from the metal contact pad and beneath the lowermost low refractive index layer to the switching volume of the electro-optic switch.

BRIEF DESCRIPTION OF THE DRAWING

The invention will be further explained by reference to the Drawing having the following Figures.

DETAILED DESCRIPTION OF PREFERRED EMBODIMENTS

Figure 1:
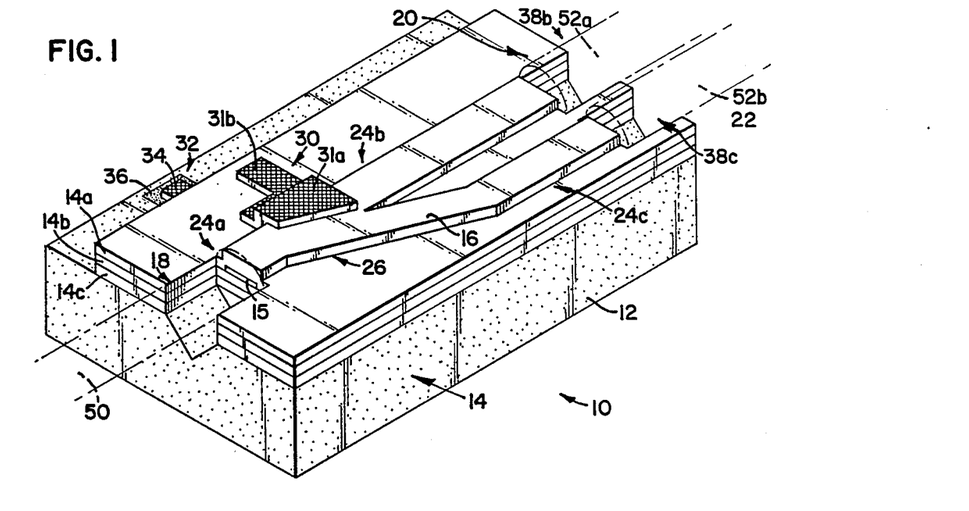
FIG. 1 shows a perspective view of a first optic switch according to the present invention.
Figure 2:
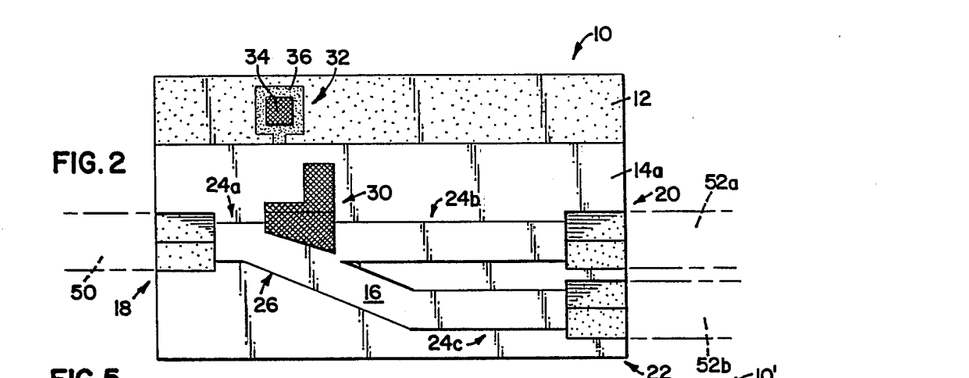
FIG. 2 shows a top view of the optic switch of FIG. 1.

Referring to the Drawing, wherein like reference numerals represent like parts and assemblies throughout the several views, FIGS. 1 and 2 illustrate a "single pole, dual throw" optic switch 10. The switch 10 is preferably an integrated optic device which includes a substrate 12 underlying a waveguide film 14. Substrate 12 is preferably fabricated from a semiconductive material, e.g., silicon or gallium arsenide (GaAs), which can support integrated electronics and which can be anistropically etched using conventional techniques.

The film 14 preferably includes a relatively high refractive index layer 14b sandwiched between a pair of lower index layers 14a and 14c. Those skilled in the art wil recognize that laminate 14 will thereby function as a waveguide, tending to trap light injected in middle layer 14b.

The thickness of high refractive index layer 14b is preferably compatible with single mode optic systems. That is, the thickness of layer 14b should be approximately 5 to 10 micrometers, this dimension being substantially equal to the core diameter of the typical single mode optic fiber core.

Layer 14b is preferably doped or otherwise fabricated so that the film varies from the stoichiometric composition as a function of position in the direction normal to the film surface. The composition variation is prescribed so as to form a graded index waveguide. In addition, layer 14b should preferably be made of a material which exhibits an electro-optic effect. Suitable materials for layer 14b would include zinc oxide (ZnO) and lithium niobate ($LiNbO_3$).

While the refractive index of layer 14b could be graded in many suitable ways, the refractive index of the layer 14 preferably changes in a manner similar to the index profile of the incoming and outgoing optic fibers. As well known to those skilled in the art, the better the refractive index profile match between the fibers and the waveguide, the better the coupling therebetween.

Layers 14a and 14c are preferably silicon dioxide ($SiO_2$) which has a lower refractive index than the waveguide layer 14b. In addition, layers 14a and 14c have a resistivity which is high enough to render the switch essentially passive (very low current needed to hold switch in a selected state).

It should be noted that the topmost layer of $SiO_2$ is not absolutely necessary. Air, having a relatively low refractive index, could in effect function as the topmost layer of the waveguide, and light would still be trapped in the graded index layer. In order for the waveguide to function most effectively, it is important that the graded index layer have an average refractive index larger than the average refractive indices of its adjacent layers.

The overall thickness of film 14 is preferably approximately 6 to 11 micrometers.

A ridge 15 is formed on top of high index layer 14b. Similarly, located atop layer 14a is a ridge 16. Ridges 15 and 16 define a waveguide channel system 24 in the film 14. Ridge 15 is an epitaxial extension of high index layer 14b; ridge 16 is an epitaxial extension of the top layer 14a of film 14. As well known to the skilled practitioner, ridges 15 and 16 define the width of the waveguide channel 24. The widths and heights of ridges 15 and 16 are based on the wavelength for which the fiber optic system and the switch are designed. For $\lambda = 0.63$ microns, for example, the widths of ridges 15 and 16 are approximately 11 to 22 microns if the heigths of ridges 15 and 16 are approximately 2 to 4 microns.

It should particularly be noted that the waveguide channels 24 could be defined in other ways, e.g., diffusion or channel etching.

At one end of ridges 15 and 16 is an input port 18 suitable for receiving an input optic fiber 50. A pair of output fibers 52a and 52b are received by output ports 20 and 22 which are located at the opposite end of ridges 15 and 16. It should be noted that there could be more than two output ports, the present invention not being limited to the specific configuration shown in the Drawing.

Waveguide 24 of optic switch 10 preferably includes three waveguide channels 24a, 24b and 24c. The waveguide channels 24 preferably intersect at a switching region or volume 26 located roughly at the center of film 14. Waveguide channel 24a interconnects input port 18 and switching volume 26; channel 24b interconnects output port 20 and switching volume 26; and channel 24c interconnects output port 22 and switching volume 26. Channels 24a and 24b are preferably substantially collinear while channel 24c intersects channels 24a and 24b at a shallow angle, preferably approximately one degree or so.

Figure 3:
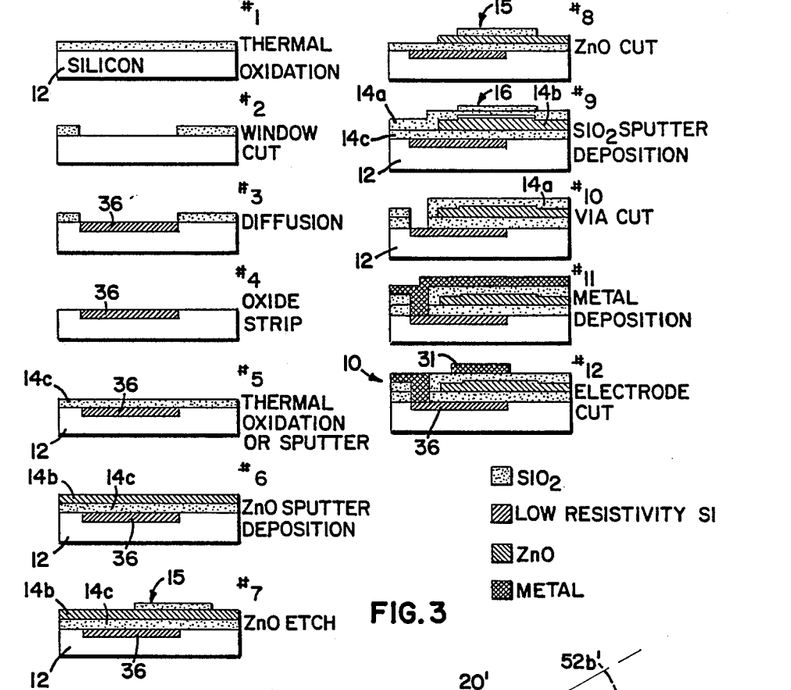
FIG. 3 illustrates the fabrication sequence for the optic switch of FIG. 1.

The switching volume 26 in the electro-optic embodiment shown in the Drawing is preferably defined by a pair of vertically spaced electrodes 30 and 32. The top electrode 30 is preferably aluminum or the like and includes an angled portion 31a riding atop ridge 16 at the intersection of channels 24a and 24b. Top electrode 30 also includes a contact pad area 31b supported by the top layer 14a of film 14. The bottom electrode 32 preferably includes a metal contact pad 34 in contact with a low resistivity region 36 established in substrate 12. As shown in FIGS. 1–3, the low resistivity area 36 extends beneath film 14 and the angled portion 31a of top electrode 30. Thus, the switching volume of channels 24a and 24b is sandwiched between conductive regions formed by the top electrode 30 and the low resistivity strip 36.

It should be noted that other electrode configurations could be used, including "lateral" electrodes. The vertically-spaced electrodes shown in the Drawing are chosen primarily because the optic axis of ZnO is typically vertical when epitaxialy deposited on an oxidized silicon surface.

Finally, the substrate 12 of switch 10 forms V-grooves 38 suitable for receiving and supporting single mode optic fibers 50 and 52. V-groove 38a is located at the input port 18. V-grooves 38b and 38c are located at output ports 20 and 22, respectively. V-grooves 38 accurately register the core of optic fibers 50 and 52 with the planar waveguide 24, such that the fibers' cores vertically align with the middle layer 14b and horizontally align with ridge 15. The V-grooves 38 are preferably anisotropically etched out of the substrate 12 as further described below.

The components of switch 10 having been described, fabrication of the device can now be explained with reference to FIG. 3. This figure generally depicts the major preferred steps involved in fabricating the switches shown in the Drawing. It should be stressed that the structure shown in FIG. 3 does not precisely correspond to either of the switching device embodiments shown in FIGS. 1 and 4.

Preliminary to the first step of FIG. 3 is the selection of a suitable substrate material. Silicon or GaAs is preferred—either can be anisotropically etched and can include integrated support electronics. It will henceforth be assumed that the substrate is made of Si. Following selection of the substrate, a layer of silicon dioxide ($SiO_2$) is deposited or formed thereon, as shown in step 1 in FIG. 3. This layer of $SiO_2$ is an intermediate product which is not represented in the final device.

Step 2 involves photolithographically cutting the $SiO_2$ to produce a window. The window defines the low resistivity strip 36 which forms a part of the bottom electrode 32.

In step 3, the silicon exposed by the window produced in step 2 is doped to produce the low resistivity region 36 shown in FIGS. 1 and 2.

The window-defining $SiO_2$ is stripped in step 4 and a new layer of $SiO_2$ is formed in step 5, either through thermal oxidation or sputtering. This $SiO_2$ layer corresponds to layer 14c of the switch 10 of FIGS. 1 and 2.

A graded index zinc oxide layer 14b is then sputtered onto the $SiO_2$ layer 14c. The $O_2$ pressure in the sputtering chamber can be controlled to produce an index profile in the ZnO which substantially matches the index profile of the optic fibers 50 and 52. A pure argon sputtering gas produces oxygen deficient ZnO films which display a higher refractive index and higher absorption coefficient. Incorporating oxygen in the sputtering gas produces more stoichiometric films with lower refractive index and lower absorption loss. Any of several different index profiles could be used, e.g., parabolic profile, $1/\cosh^2$ profile or exponential profile. Reference is made to "Integrated Optics", T. Tamir, ed., Springer Verlag, Second Ed. (1982), pp. 54–59, incorporated herein by reference.

In step 7 the ridge 15 is produced by photolithographically etching the zinc oxide in all areas other than the ridge 15. Similarly, in step 8 a portion of the zinc oxide layer is removed altogether using a chemical etch which does not substantially attack the underlying $SiO_2$ layer 14c.

In step 9, a top layer 14a of $SiO_2$ is deposited such that the graded index zinc oxide layer 14b is sandwiched between relatively low refractive index layers 14a and 14c. The top ridge 16 is present atop layer 14a by virtue of the ridge 15 in the ZnO. That is, topmost layer 14a is not etched to form ridge 16—it simply exists because of underlying ridge 15.

As shown in step 10, a via is photolithographically defined and chemically cut to reveal the low resistivity strip 36. Metal, e.g., aluminum, is deposited on the topmost $SiO_2$ layer 14a and in the via, making contact with the low resistivity strip 36.

The electrodes 30 and 32 are defined and electrically isolated through a chemical cutting operation shown in step 12, wherein some of the metal previously deposited is removed. It should be noted that steps 11 and 12 show the contact pad 34 of bottom electrode 32 riding on a layer of $SiO_2$, whereas in FIG. 1 it appears that pad 34 is directly in contact with elemental Si. It is necessary that the pad 34 be in contact with the low resistivity region, but a metallic via could be used to effect that contact, as shown in steps 11 and 12 of FIG. 3.

Though not shown in FIG. 3, V-grooves 38 are preferably formed in the substrate 12. The V-grooves 38 are anisotopocally etched using standard techniques as disclosed in the article "Thin-Film Laser-to-Fiber Coupler", Boivin et al, Applied Optics, Vol. 13, No. 2, Feb. 1974, pp. 391–395, incorporated herein by reference. The width of the etching window determines the depth of the cut and therefore the position of the fiber's core relative to the top surface of the substrate 12. Thus, knowing the height of the layer 14b above the top surface of substrate 12, the width of the etching window can be chosen so that the fiber's core precisely aligns with the center of layer 14b. This permits the optimum index matching of fibers 50 and 52 and layer 14 so as to maximize mode compatibility and resultant coupling efficiency.

As noted above, additional electronics could be integrated into substrate 12 as needed.

The operation of optic switch 10 can now be described. An incoming single mode fiber 50 is placed in V-groove 38a and optionally secured therein with index matching adhesive. Similarly, outgoing single mode optic fibers 52a and 52b, respectively, are placed in V-grooves 38b and 38c. As discussed above, the depths of V-grooves 38 are critical in that the cores of fibers 50 and 52 must precisely align with the layer 14b. Any misalignment reduces the fiber/waveguide coupling.

Once the fibers are in place, light provided by incoming optic fiber 50 can be selectively directed to either output port 20 or output port 22. Normally, light will pass from input port 18 to output port 20. However, when the proper voltage is provided to electrodes 30 and 32 the refracive index in the switching volume region 26 is reduced to the point that there is a total internal reflection (TIR) of the light into waveguide channel 24c. The electro-optic effect thus causes the light to exit from output port 22.

While the voltage across electrodes 30 and 32 will depend upon the precise geometry of the switch 10, generally a voltage of approximately 50 to 100 volts will be adequate. The preferred polarity of the voltage on 30 and 32 is such that for TE modes and $\lambda = 0.63$ micron, electrode 30 is positive relative to electrode 32. The polarity of the voltage depends on the sign of the electro-optic tensor component $r_{13}$ of ZnO. At $\lambda = 0.63$ micron, $r_{13} < 0$ and at $\lambda = 3.4$ microns, $r_{13} > 0$. The change in the ZnO refractive index for the electrode configuration of FIG. 1 is given by:

$$\Delta n_i = (n_i^3/2) r_{ij} E_j$$

where $n_i$ = refractive index,
$r_{ij}$ = electro-optic coefficient, and
$E_j$ = applied electric field ZnO films generally grow with their optic axis perpendicular to the substrate. Following convention, the optic axis is parallel to the Z axis, i.e., $i = j = 3$. In the preferred switch configurations, the electric field is applied parallel to the Z axis so that:

$$\Delta n_i = \left(\frac{n_i^3 V}{t}\right) r_{i,3}$$

where t is the ZnO film thickness.

Figure 4:
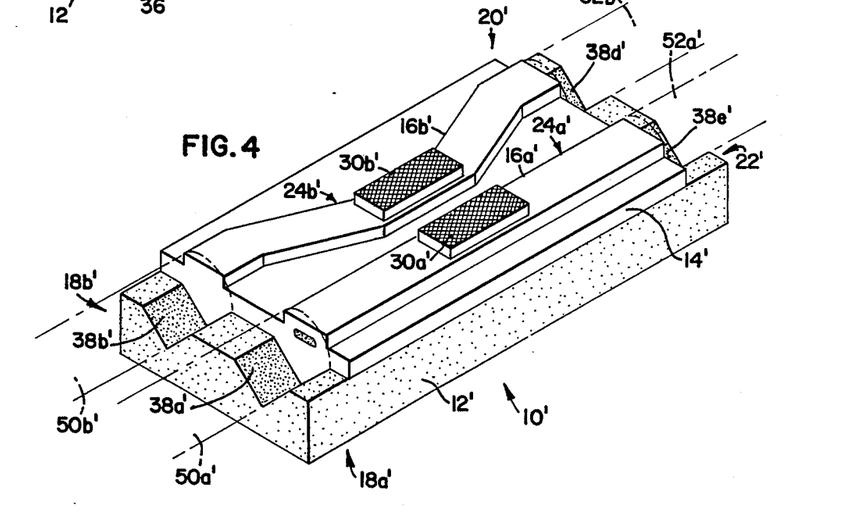
FIG. 4 shows a perspective view of a second optic switch according to the present invention.
Figure 5:
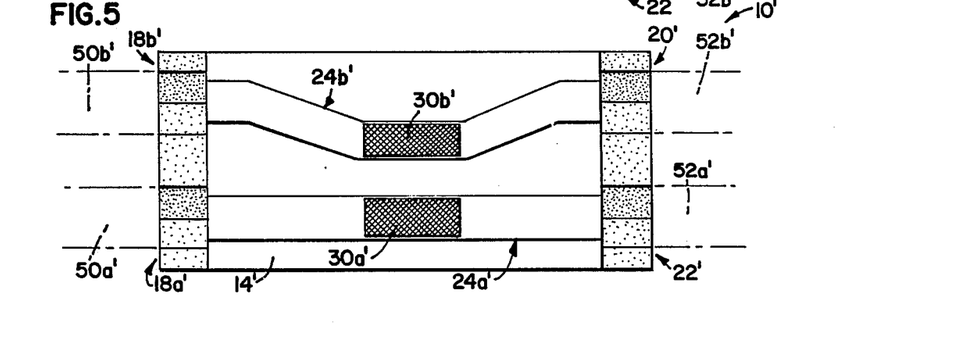
FIG. 5 shows a top view of the optic switch of FIG. 4.

FIG. 4 shows a perspective view of a second embodiment 10' of an optic switch constructed according to the invention. The switch or coupler 10' includes many of the same components as switch 10 as shown in FIGS. 1 and 2. Therefore, many of the reference numerals applied to the first embodiment are again utilized, but "primes" are added to indicate that they apply to the second embodiment.

Coupler 10' includes a substrate 12' and a film 14' wherein a central region of the film 14' again includes a graded index planar waveguide. Substrate 12' is preferably silicon or GaAs so that fiber support grooves 38 can be anisotropically etched therein, and so that support electronics can easily be integrated along with the solid state optics. Film 14' is preferably substantially similar to film 14, in terms of its constitution and dimensions.

Coupler 10' includes output ports 20' and 22'. Unlike switch 10, however, coupler 10' includes a pair of input ports 18a' and 18b'.

Ridges 16a' and 16b' (preferably in conjunction with ridge 15a' and 15b' (not shown)) define a pair of waveguide channels 24a' and 24b'. Channel 24a' interconnects input port 18a' and output port 22', whereas channel 24b' interconnects input port 18b' and output port 20'.

Waveguide 24a' is preferably substantially straight while waveguide 24b' is preferably curved or angled so that the central portions of waveguides 24' are substantially adjacent. Metal electrodes 30a' and 30b' are deposited on waveguides 24.

A bottom electrode 32' (not shown) is located below electrodes 30', wherein the electrodes are longitudinally aligned with the waveguides 24'. The electrodes 30' and 32' sandwich film 14' and are electrically biased to control the coupling between the waveguides 24a' and 24b'.

Finally, etched grooves 38' for precisely supporting corresponding optic fibers 50' and 52' are formed in the substrate 12' in a manner similar to that described with reference to optic switch 10.

The fabrication of coupler 10' is substantially identical to fabrication of switch 10. FIG. 3 shows the general steps involved in fabricating the switch 10'.

In operation, light is provided through optic fiber 50a' to input port 18a'. The light normally passes through waveguide 24a' to output port 22' and into optic fiber 52a'. When sufficient voltages are supplied across electrodes 30a', 30b' and 32', the refractive index of the zinc oxide graded index layer 14b' of waveguides 24' is changed in the area under electrodes 30', thus causing a coupling between the waveguides 24'. The coupling created at the swtiching volume allows a portion of the light in waveguide 24a' to couple into waveguide 24b' and exit output port 20' and optic fiber 52b'.

In like manner, light which is received by input port 18b' can be directed either solely to output port 20' or can be directed to both of the output ports 20' and 22'. This coupling phenomenon is well known and results from the evanescent fields established in the waveguides 24'.

It should be emphasized that the present invention is not limited to any particular components, materials or configurations and modifications of the invention will be apparent to those skilled in the art in light of the foregoing description. This description is intended to provide specific examples of individual embodiments which clearly disclose the present invention. Accordingly, the invention is not limited to these embodiments or to the use of elements having the specific configurations and shapes as presented herein. All alternative modifications and variations of the present invention which fall within the spirit and broad scope of the appended claims are included.

We claim:

1. A single mode integrated optic switch suitable for selectively coupling a first input fiber with either a first output fiber or a second output fiber, the fibers having cores, comprising:
   (a) a substrate;
   (b) a waveguide operatively supported by the substrate, comprising:
      (i) a first layer immediately atop the substrate having a first average refractive index;
      (ii) a second layer atop the first layer having a second average refractive index larger than the first average refractive index and having a graded refractive index, wherein the second layer is suitable for substantial alignment with the fibers' cores and wherein the waveguide is suitable for single mode light transmission the second layer being relatively thicker than the first layer while still supporting transmissions of only a single waveguide mode;
      (iii) a first input port at one end of the waveguide for operatively receiving the first input fiber; and (iv) first and second output ports at the other end of the waveguide for operatively receiving the first and second output fibers, respectively, wherein the waveguide normally guides light from the first input port to the first output port; and (c) means in operative proximity of the waveguide for altering the refractive index of a portion of the waveguide to switch at least a portion of the light from the first output port to the second output port.

2. The optic switch of claim 1, wherein the refractive index altering means comprises means for electro-optically altering the refractive index of a portion of the waveguide.

3. The optic switch of claim 1, further comprising anisotropically etched V-grooves at the input and output ports suitable for receiving the optic fibers.

4. The optic switch of claim 1, wherein the thickness of the second layer is approximately equal to the diameter of the fibers' cores.

5. The optic switch of claim 1, further comprising a third layer having a third average refractive index smaller than the second average refractive index, wherein the second layer is between the first and third layers.

6. The optic switch of claim 5, wherein the refractive index altering means comprises means for electro-optically altering the refractive index of a portion of the second layer.

7. The optic switch of claim 6, wherein the thickness of the second layer is substantially equal to the diameter of the fibers' cores.

8. The optic switch of claim 5, wherein the substrate is silicon, the first and third waveguide layers are silicon dioxide, and the second layer is zinc oxide.

9. The optic switch of claim 1, wherein the refractive index altering means comprises upper and lower electrodes in operative contact with the waveguide, wherein the portion of the waveguide sandwiched between the electrodes defines a switching volume, and wherein when a voltage of the proper magnitude and polarity is applied across the electrodes, the refractive index of the waveguide in the sandwiched portion decreases to cause total internal reflection of the light within the waveguide, whereby light is reflected toward the second output port.

10. The optic switch of claim 9, wherein the lower electrode comprises a low resistivity area formed in the substrate and a contact pad in operative contact with the low resistivity area, wherein the low resistivity area runs beneath the waveguide and the switching volume.

11. The optic switch of claim 1, further comprising a second input port proximate the first input port suitable for operatively receiving a second input fiber, wherein the waveguide normally guides light from the first input port to the first output port and from the second input port to the second output port, and wherein when the refractive index of the waveguide is altered at least a portion of light entering the first input port is switched to the second output port and at least a portion of the light entering the second input port is switched to the first output port.

12. A single mode integrated optic switch, suitable for selectively coupling a first input fiber with either a first output fiber or a second output fiber, the fibers having cores, comprising:

(a) a silicon substrate;
(b) a waveguide operatively supported by the substrate, comprising:

(i) a first silicon dioxide layer immediately stop the substrate having a first average refractive index;

(ii) a second zinc oxide layer atop the first layer having a second average refractive index larger than the first average refractive index and having a graded refractive index, a spacial variation in the oxygen content of the zinc oxide creating its graded refractive index, wherein the second layer is suitable for substantial alignment with the fibers' cores and wherein the waveguide is suitable for single mode light transmission, the second layer having a thickness substantially equal to the diameter of the fiber's cores;

(iii) a third silicon dioxide layer having a third average refractive index smaller than the second average refractive index, wherein the second layer is between the first and third layers;

(iv) a first input port at one end of the waveguide for operatively receiving the first input fiber; and (v) first and second output ports at the other end of the waveguide for operatively receiving the first and second output fibers, respectively, wherein the waveguide normally guides light from the first input port to the first output port; and (c) means in operative proximity of the waveguide for electro optically altering the refractive index of a portion of the second layer of the waveguide so as to switch at least a portion of the light from the first output port to the second output port.

13. The optic switch of claim 12 wherein the optical axis of the zinc oxide is perpendicular to the substrate.

14. The optic switch of claim 13, wherein the zinc oxide layer is formed by sputtering.

15. An electro-optic single mode integrated optic switch suitable for selectively coupling a first input fiber with either a first output fiber or a second output fiber, the fibers having cores, comprising:

(a) a silicon substrate;
(b) a three-layer waveguide operatively supported by the substrate comprising:

(i) a lower layer of silicon dioxide;

(ii) a middle layer of sputtered zinc oxide having its optical axis perpendicular to the substrate and having a graded refractive index created by an oxygen gradient in the zinc oxide, wherein the effective thickness of the middle layer is compatible with single mode light transmission;

(iii) an upper layer of silicon dioxide, wherein the upper and lower silicon dioxide layers sandwich the middle zinc oxide layer;

(iv) a first input port at one end of the waveguide comprising an anisotropically etched V-groove suitable for supporting the first input fiber such that its core is aligned with the middle layer; and (v) first and second output ports at the other end of the waveguide each comprising an anisotropically etched V-groove suitable for supporting its associated output fiber such that the core is aligned with the middle layer, wherein light is normally guided from the first input port to the first output port; and (c) upper and lower electrodes in operative contact with the upper and lower silicon dioxide layers, respectively, such that an electro-optic switching volume is formed in the portion of the zinc oxide layer between the electrodes, wherein when a preselected voltage of the proper polarity and magnitude is applied across the electrodes, the refractive index of the zinc oxide in the switching volume decreases to cause total internal reflection of the light away from the first output port and toward the second output port.

16. A single mode integrated optic switch suitable for selectively coupling a first or a second input fiber with either a first or a second output fiber, the fibers having cores, comprising:
   (a) a substrate;
   (b) a waveguide operatively supported by the substrate, comprising:
      (i) a first layer immediately atop the substrate having a first average refractive index;
      (ii) a second layer atop the first layer having a second average refractive index larger than the first average refractive index and having a graded refractive index, wherein the second layer is suitable for substantial alignment with the fibers' cores and wherein the waveguide is suitable for single mode light transmission;
      (iii) first and second input ports at one end of the waveguide for operatively receiving the first and second input fibers, respectively; and
      (iv) first and second output ports at the other end of the waveguide for operatively receiving the first and second output fibers, respectively, wherein light is normally guided from the first input port to the first output port or from the second input port to the second output port; and
   (c) means in operative proximity of the waveguide for altering the refractive index of the waveguide to guide at least a portion of the light from the first input port to the second output port or at least a portion of the light from the second input port to the first output port.

17. The optic switch of claim 16, wherein the refractive index altering means comprises means for electro-optically altering the refractive index of a portion of the waveguide.

18. The optic switch of claim 16, further comprising anisotropically etched V-grooves at the input and output ports suitable for receiving the optic fibers.

19. The optic switch of claim 16, wherein the thickness of the second layer is approximately equal to the diameter of the fibers' cores.

20. The optic switch of claim 16, wherein the refractive index altering means comprises upper and lower electrodes in operative contact with the waveguide, wherein the portion of the waveguide sandwiched between the electrodes defines a switching volume, and wherein when a voltage of the proper magnitude and polarity is applied across the electrodes, the refractive index of the waveguide in the sandwiched portion changes, whereby light is guided toward the second output port.

21. The optic switch of claim 20, wherein the lower electrode comprises a low resistivity area formed in the substrate and a contact pad in operative contact with the low resistivity area, wherein the low resistivity area runs beneath the waveguide and the switching volume.

22. A single mode integrated optic switch, suitable for selectively coupling a first or a second input fiber with either a first or a second output fiber, the fibers having cores, comprising:
   (a) a silicon substrate;
   (b) a waveguide operatively support by the substrate, comprising:
      (i) a first silicon dioxide layer immediately atop the substrate having a first average refractive index;
      (ii) a second zinc oxide layer atop the first layer having a second average refractive index larger than the first average refractive index and having a graded refractive index, a spacial variation in the oxygen content of the zinc oxide creating its graded refractive index, wherein the second layer is suitable for substantial alignment with the fibers' cores and wherein the waveguide is suitable for single mode light transmission;
      (iii) a third silicon dioxide layer having a third average refractive index smaller than the second average refractive index, wherein the second layer is between the first and third layers;
      (iv) first and second input ports at one end of the waveguide for operatively receiving the first and second input fibers, respectively; and
      (v) first and second output ports at the other end of the waveguide for operatively receiving the first and second output fibers, respectively, wherein light is normally guided from the first input port to the first output port or from the second input port to the second output port; and
   (c) means in operative proximity of the waveguide for altering the refractive index of the waveguide to guide at least a portion of the light from the first input port to the second output port or at least a portion of the light from the second input port to the first output port.

23. The optic switch of claim 22, wherein the refractive index altering means comprises means for electro-optically altering the refractive index of a portion of the second layer.

24. The optic switch of claim 23, wherein the thickness of the second layer is substantially equal to the diameter of the fibers' cores.

25. The optic switch of claim 22, wherein the optical axis of the zinc oxide is perpendicular to the substrate.

26. The optic switch of claim 25, wherein the zinc oxide layer is formed by sputtering.

27. A single mode integrated optic switch suitable for selectively coupling a first or a second input fiber with either a first or a second output fiber, the fibers having cores, comprising:
   (a) a silicon substrate;
   (b) a three-layer waveguide operatively supported by the substrate comprising:
      (i) a lower layer of silicon dioxide;
      (ii) a middle layer of sputtered zinc oxide having its optical axis perpendicular to the substrate and having a graded refractive index created by an oxygen gradient in the zinc oxide, wherein the effective thickness of the middle layer is compatible with single mode light transmission;
      (iii) an upper layer of silicon dioxide, wherein the upper and lower silicon dioxide layers sandwich the middle zinc oxide layer;
      (iv) first and second input ports at one end of the waveguide each comprising an anisotropically etched V-groove suitable for supporting its associated input fiber such that its core is aligned with the middle layer; and
      (v) first and second output ports at the other end of the waveguide each comprising an anisotropically etched V-groove suitable for supporting its associated output fiber such that its core is aligned with the middle layer, wherein light is normally guided from the first input port to the first output port and from the second input port to the second output port; and (c) upper and lower electrodes in operative contact with the upper and lower silicon dioxide layers, respectively, such that an electro-optic switching volume is formed in the portion of the zinc oxide layer between the electrodes, wherein when a preselected voltage of the proper polarity and magnitude is applied across the electrodes, the refractive index of the zinc oxide in the switching volume changes to cause at least a portion of the light entering the first input port to be directed toward the second output port, and to cause at least a portion of the light entering the second input port to be directed toward the first output port.

* * * * *

UNITED STATES PATENT AND TRADEMARK OFFICE
CERTIFICATE OF CORRECTION

PATENT NO. : 4,759,595

DATED : July 26, 1988

INVENTOR(S) : WARREN T. BOORD AND ANIL K. JAIN

It is certified that error appears in the above-identified patent and that said Letters Patent is hereby corrected as shown below: Title page:

In the Abstract, line 7, for "(14a and b 14c)" read --(14a and 14c)--.
In column 1, line 41, for "Unfortunatley" read --Unfortunately--.
In column 4, line 51, for "heigths" read --heights--.
In column 5, line 28, for "epitaxialy" read --epitaxially--.
In column 6, line 46, for "anisotopocally" read --anisotopically--.
In column 8, line 24, for "swtiching" read --switching--.
In column 10, line 1, for "stop" read --atop--.
In column 11, line 67, for "support" read --supported.

Signed and Sealed this

Thirteenth Day of December, 1988

Attest:

DONALD J. QUIGG

*Attesting Officer*  *Commissioner of Patents and Trademarks*